(12) United States Patent
Hockridge (10) Patent No.: US 10,989,248 B2
(45) Date of Patent: Apr. 27, 2021

(54) INTERCHANGEABLE ARM QUICK RELEASE MECHANISM FOR CHEST PRESS EXERCISE MACHINE

(71) Applicant: HOIST FITNESS SYSTEMS, INC., Poway, CA (US)

(72) Inventor: Bruce Hockridge, San Diego, CA (US)

(73) Assignee: HOIST FITNESS SYSTEMS, INC., Poway, CA (US)

( * ) Notice: Subject to any disclaimer, the term of this patent is extended or adjusted under 35 U.S.C. 154(b) by 105 days.

(21) Appl. No.: 16/449,816

(22) Filed: Jun. 24, 2019

(65) Prior Publication Data

US 2020/0003250 A1 Jan. 2, 2020

Related U.S. Application Data

(60) Provisional application No. 62/691,422, filed on Jun. 28, 2018.

(51) Int. Cl.
*F16B 45/02* (2006.01)
*A63B 21/00* (2006.01)

(52) U.S. Cl.
CPC ........ *F16B 45/025* (2013.01); *A63B 21/4035* (2015.10); *F16B 45/02* (2013.01); *A63B 21/00061* (2013.01)

(58) Field of Classification Search
CPC .... F16B 45/025; F16B 45/02; A63B 21/4035; A63B 21/00061; A63B 1/00
See application file for complete search history.

(56) References Cited

U.S. PATENT DOCUMENTS

| 896,084 | A | * | 8/1908 | Hammond | ............... F16B 45/02 24/599.4 |
|---|---|---|---|---|---|
| 4,288,892 | A | | 9/1981 | Mardirossian | |
| 4,809,972 | A | | 3/1989 | Rasmussen et al. | |
| 6,561,960 | B2 | | 5/2003 | Webber | |
| 6,694,578 | B1 | | 2/2004 | Nicoll | |
| 7,749,140 | B1 | | 7/2010 | Lindemeier et al. | |
| 10,138,923 | B2 | * | 11/2018 | Vaccari | ..................... F16B 1/00 |
| 10,563,689 | B2 | * | 2/2020 | Berndorfer | ............. F16B 45/02 |
| 2004/0208692 | A1 | * | 10/2004 | Anthony | ............... A01K 27/005 403/327 |

(Continued)

OTHER PUBLICATIONS

Revolving Lat Pulldown Bar-Solid (48"), product page, American Barbell LLC, Mar. 18, 2016, 6 pages.

(Continued)

*Primary Examiner* — Robert Sandy
*Assistant Examiner* — Rowland Do
(74) *Attorney, Agent, or Firm* — David R. Heckadon; Gordon Rees Scully; Mansukhani LLP (57) ABSTRACT

A quick release mechanism for an exercise arm assembly enabling a user to switch exercise arms very quickly, the mechanism having: (a) an elongated body; (b) a curved aperture passing laterally across a distal end of the elongated body, cutting downwardly through the elongated body, and being angled towards the distal end of the elongated body; (c) a button assembly positioned near the distal end of the elongated body, moveable to either project into or project away from the aperture; and a biasing member that urges the extending portion of the button assembly into the locked position.

7 Claims, 10 Drawing Sheets

(56) References Cited

U.S. PATENT DOCUMENTS

2008/0222859 A1* 9/2008 Chepurny ............ A61G 7/1049
24/599.2
2008/0250615 A1* 10/2008 Emenheiser ............ F16B 45/02
24/599.5

OTHER PUBLICATIONS

International Searching Authority, International Search Report and Written Opinion for corresponding International Application No. PCT/US2019/038658, dated Sep. 13, 2019, 9 pages.

* cited by examiner

INTERCHANGEABLE ARM QUICK RELEASE MECHANISM FOR CHEST PRESS EXERCISE MACHINE

RELATED APPLICATION

This application claims priority to U.S. Provisional Patent Application Ser. No. 62/691,422, of same title, filed Jun. 28, 2018, incorporated herein in its entirety for all purposes.

TECHNICAL FILED

The present invention relates to quick release attachment mechanisms for interchangeable exercise arms for chest press machines and for other exercise machines.

SUMMARY OF THE INVENTION

In preferred aspects, the present system provides a quick release attachment mechanism for an exercise machine (such as a chest press machine) that can be used to quickly switch between different exercise arms (including both rigid articulating arms and flexible strap arms).

In preferred aspects, the present system provides a quick release mechanism for an exercise arm assembly, comprising: (a) an elongated body; (b) a curved aperture passing laterally across a distal end of the elongated body, the curved aperture cutting downwardly through the elongated body with a front end of the aperture being angled towards the distal end of the elongated body; (c) a button assembly positioned near the distal end of the elongated body, wherein a forwardly extending portion of the button assembly is moveable to: (i) project into the aperture when the button assembly is in a locked position, or (ii) project away from the aperture when the button assembly is in an unlocked position; and (d) a biasing member that urges the extending portion of the button assembly into the locked position.

In preferred aspects, the curved aperture is dimensioned to receive a square-shaped or triangle-shaped ring (on the proximal end of an exercise arm) passing therethrough.

The button assembly preferably has a finger contact pad projecting upwardly out of the elongated body. When a user pushes down on the finger contact pad, the button assembly pivots around a pin. This causes the elongated portion of the button assembly to project into the aperture and lock the ring in position (thereby securing the exercise arm to the chest press machine).

DETAILED DESCRIPTION OF THE DRAWINGS

The present system provides a novel quick release mechanism that can be used to attach different sets of exercise arms to a chest press machine. (It is to be understood, however, that the present quick release mechanism can be used with all manner of exercise equipment and is not limited just to chest press machines).

Figure 1:
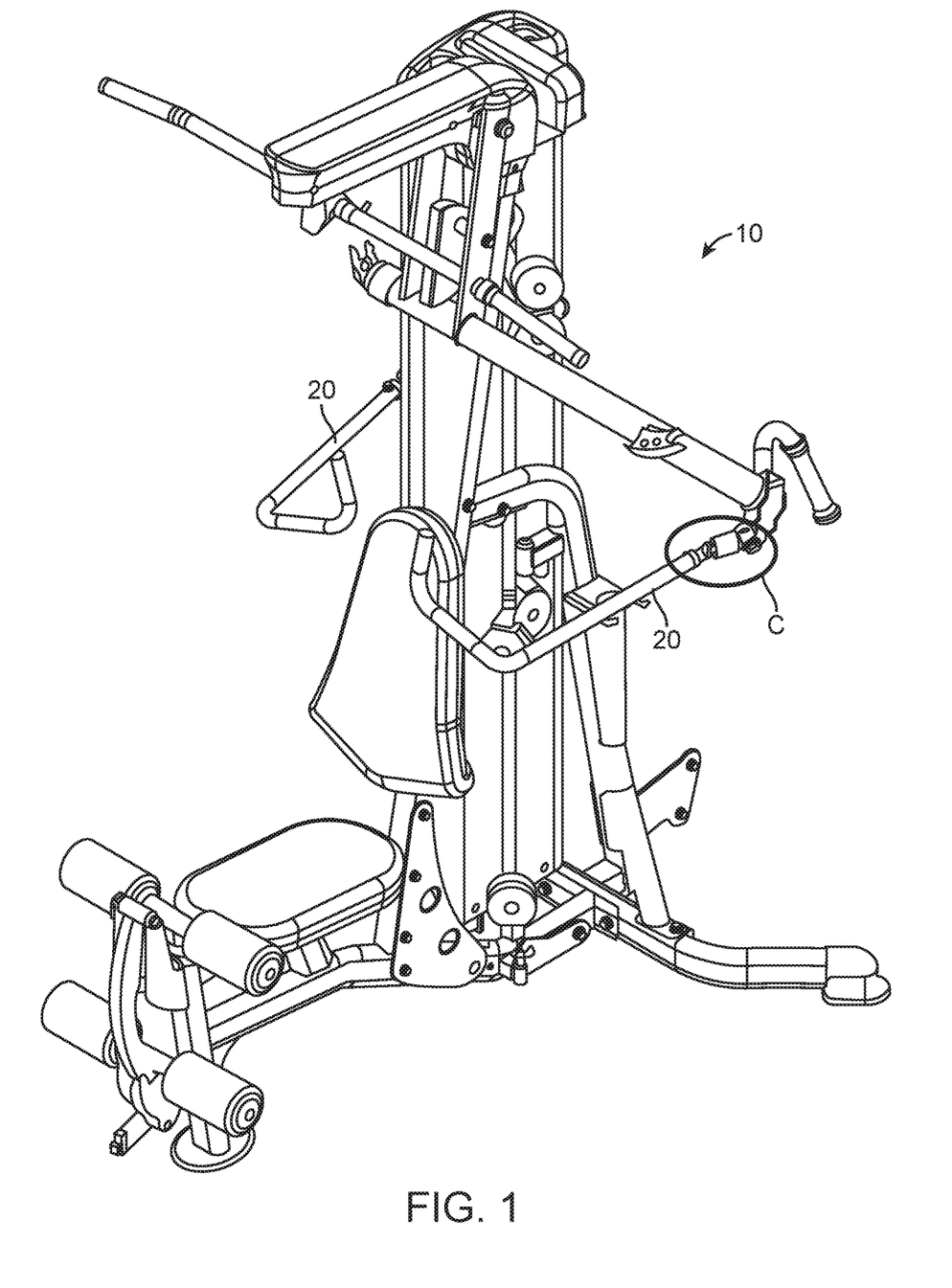
FIG. 1 is a perspective view of a chest press exercise machine with a pair of rigid exercise arms attached thereto.
Figure 2:
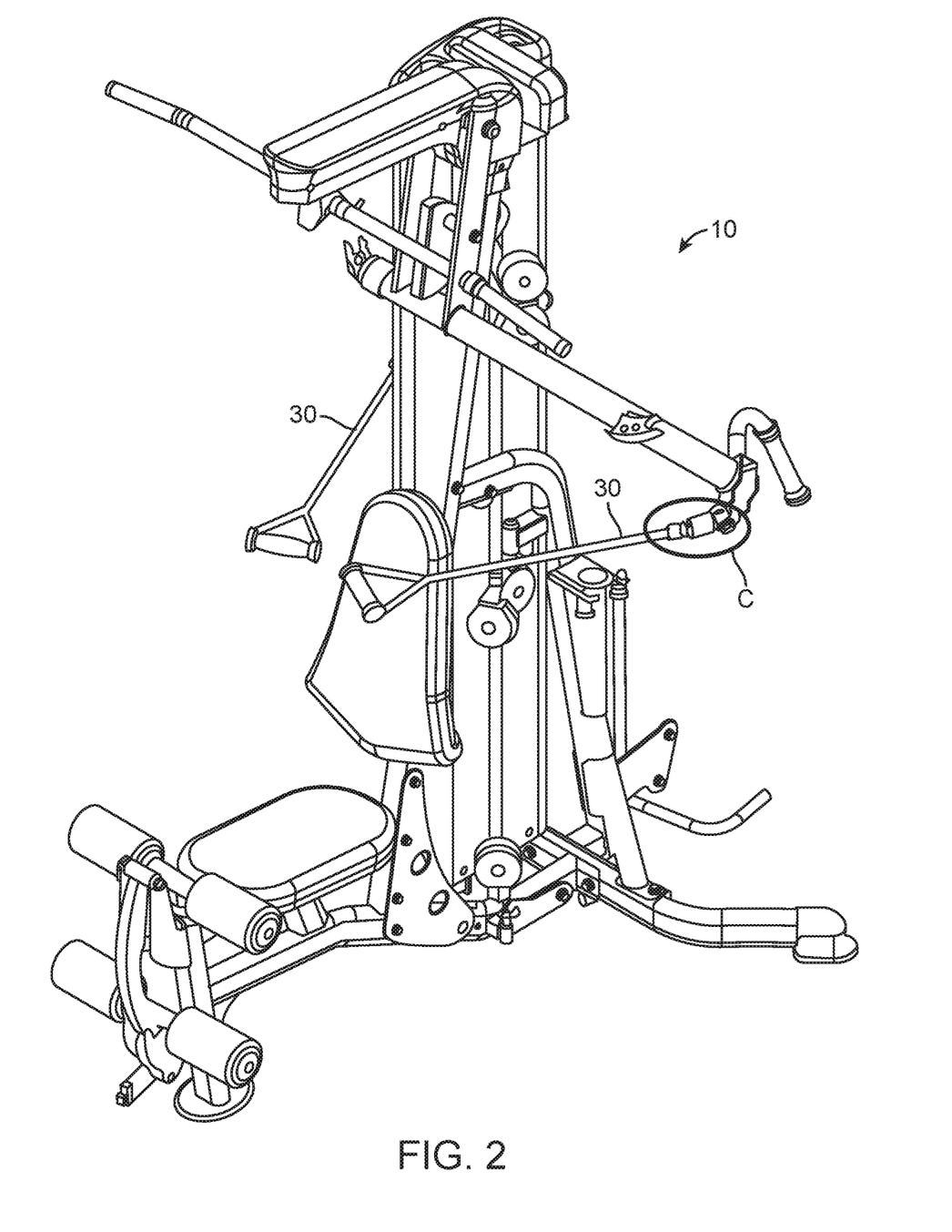
FIG. 2 is a perspective view of a chest press exercise machine with a pair of flexible strap exercise arms instead attached thereto.

FIG. 1 illustrates a chest press machine 10 to which a pair of rigid exercise arms 20 are attached. (The small circle C highlights the present quick release system). FIG. 2 illustrates chest press machine 10 with a pair of flexible strap arms 30 instead attached thereto. (Again, the small circle C highlights the present quick release system).

Figure 3:
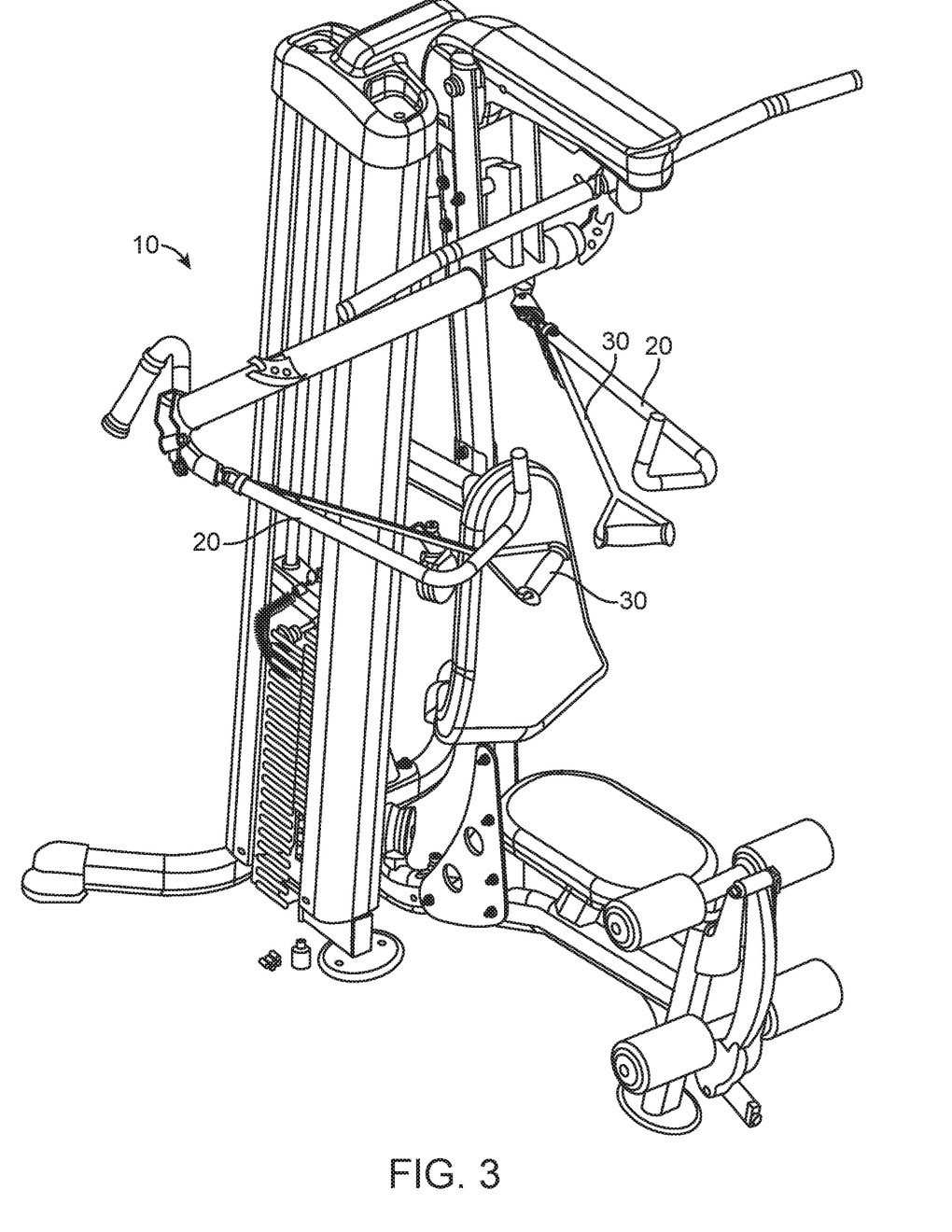
FIG. 3 is a perspective view of a chest press exercise machine showing both rigid and flexible arms attached thereto (for comparison purposes).
Figure 4:
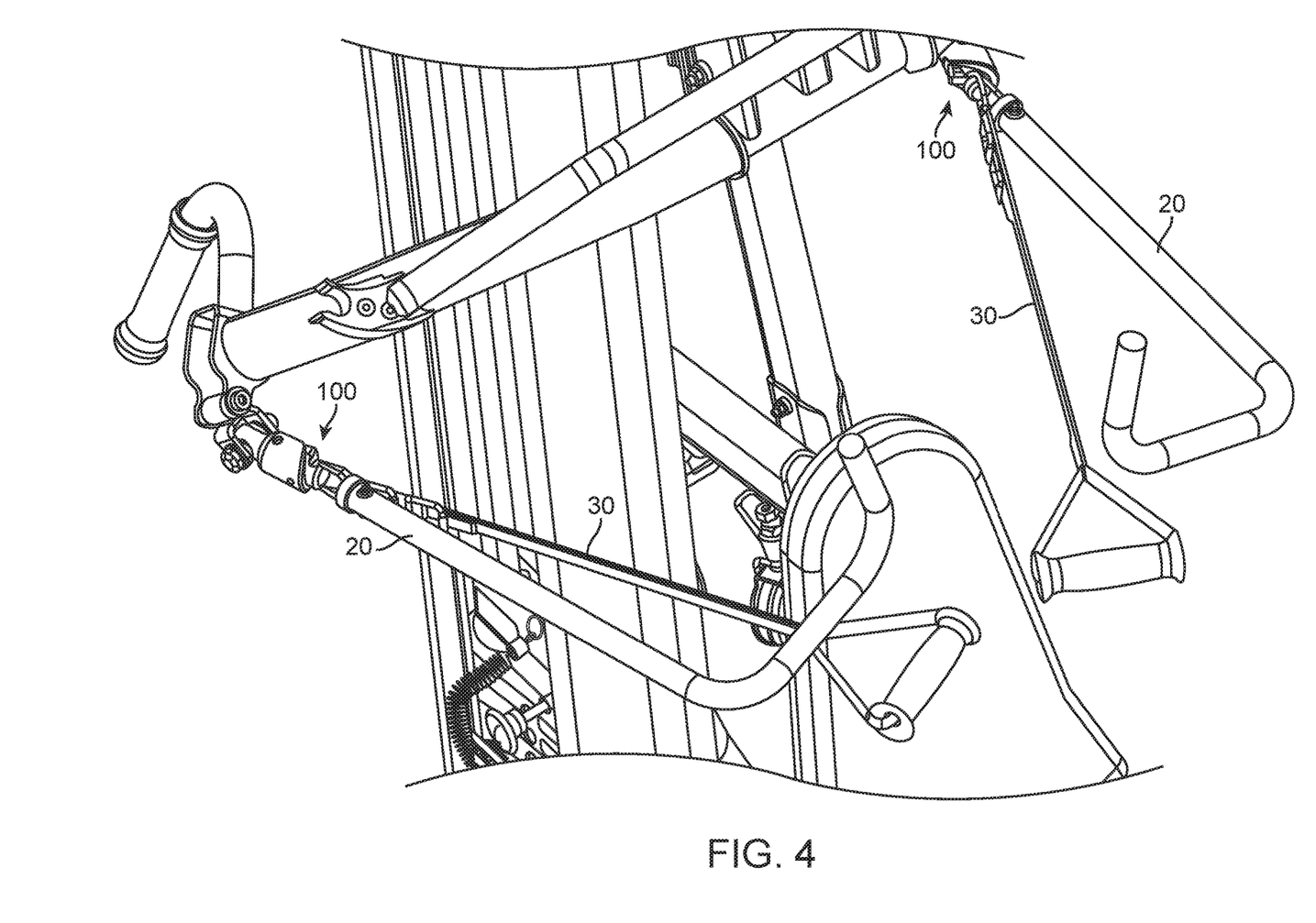
FIG. 4 is a close-up view corresponding to FIG. 3.

FIGS. 3 and 4 show both rigid exercise arms 20 and flexible strap arms 30 attached to machine 10. These two figures are meant to show how the rigid exercise arms 20 and flexible strap arms 30 are interchangeable with one another. As such, normally both are not attached to machine 10 at the same time. It is to be understood, however, that the present system can encompass embodiments with multiple exercise arms attached.

The present system provides a quick release mechanism 100 for connecting these different types of arms (20 and 30) to device 10. Further details of the quick release mechanism are provided in the various views of FIGS. 5 to 9, as follows.

Quick release mechanism 100 comprises: an elongated body 110; a curved aperture 120 passing laterally across a distal end of elongated body 110, the curved aperture 120 cutting downwardly through the elongated body with a front end of the aperture being angled towards the distal end of the elongated body. Also included is a button assembly 130 positioned near the distal end of elongated body 110.

Figure 5:
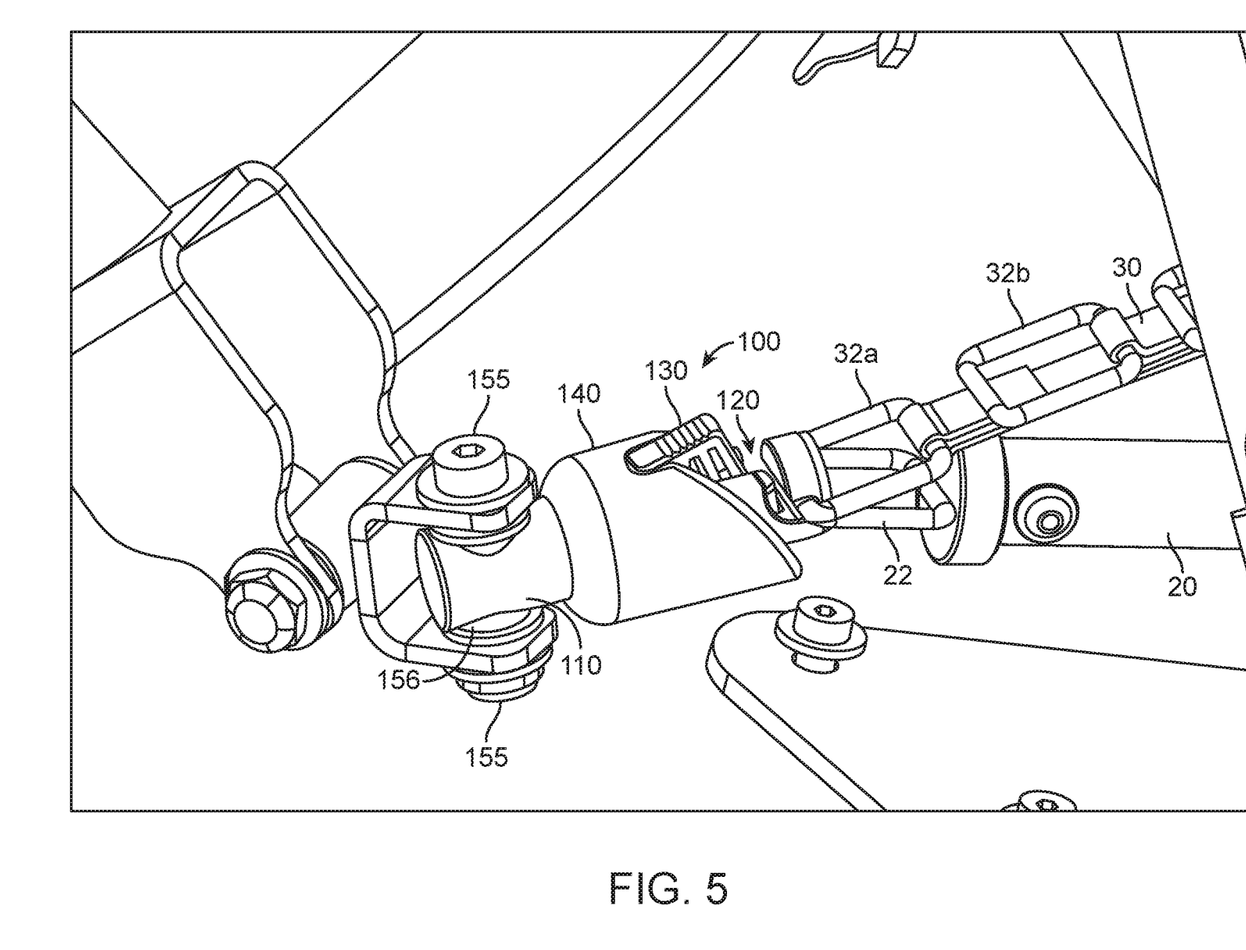
FIG. 5 is a further close up view of a portion of FIG. 3, showing the present quick release mechanism).
Figure 6:
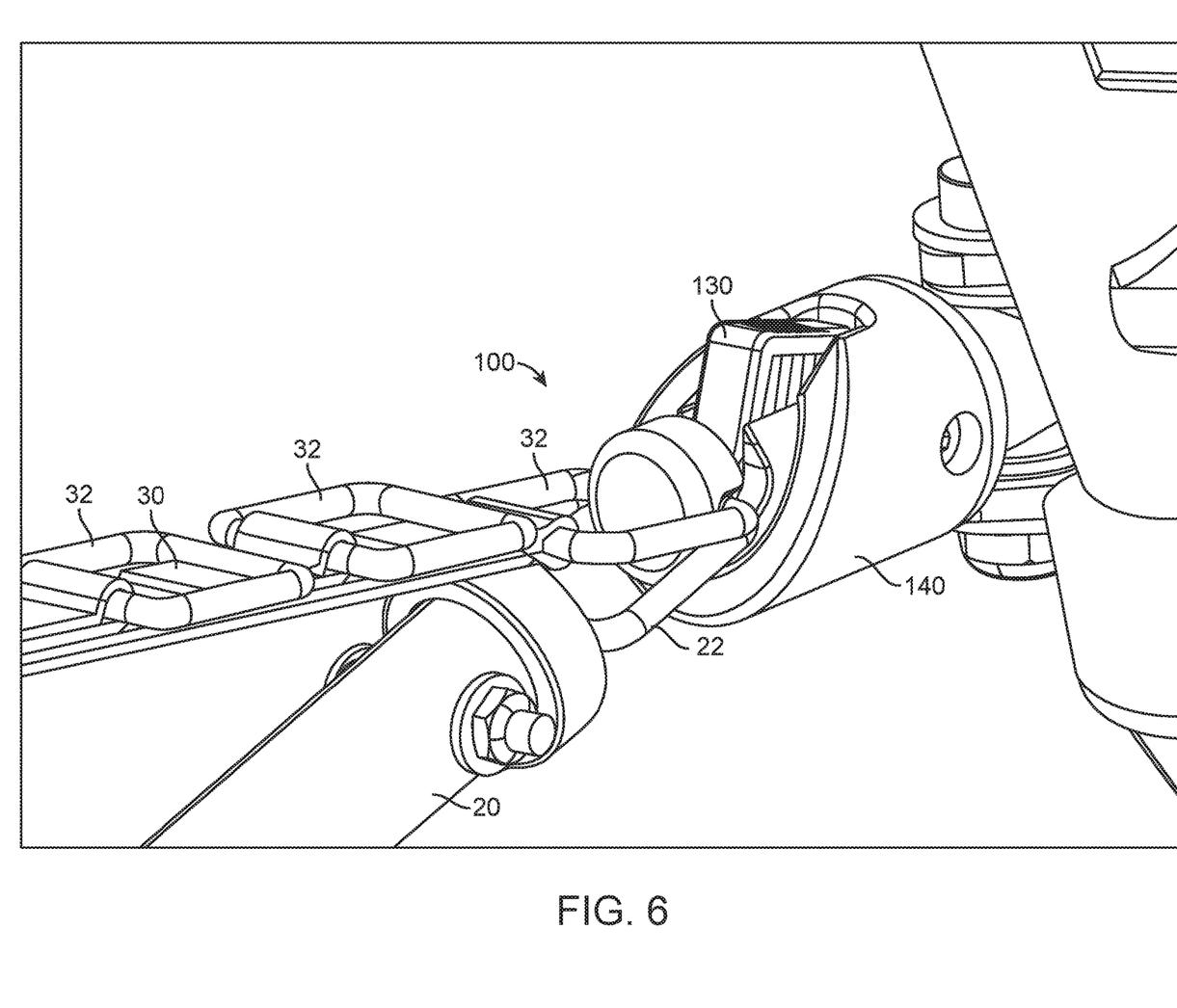
FIG. 6 corresponds to FIG. 5, but viewed from a different angle.
Figure 7:
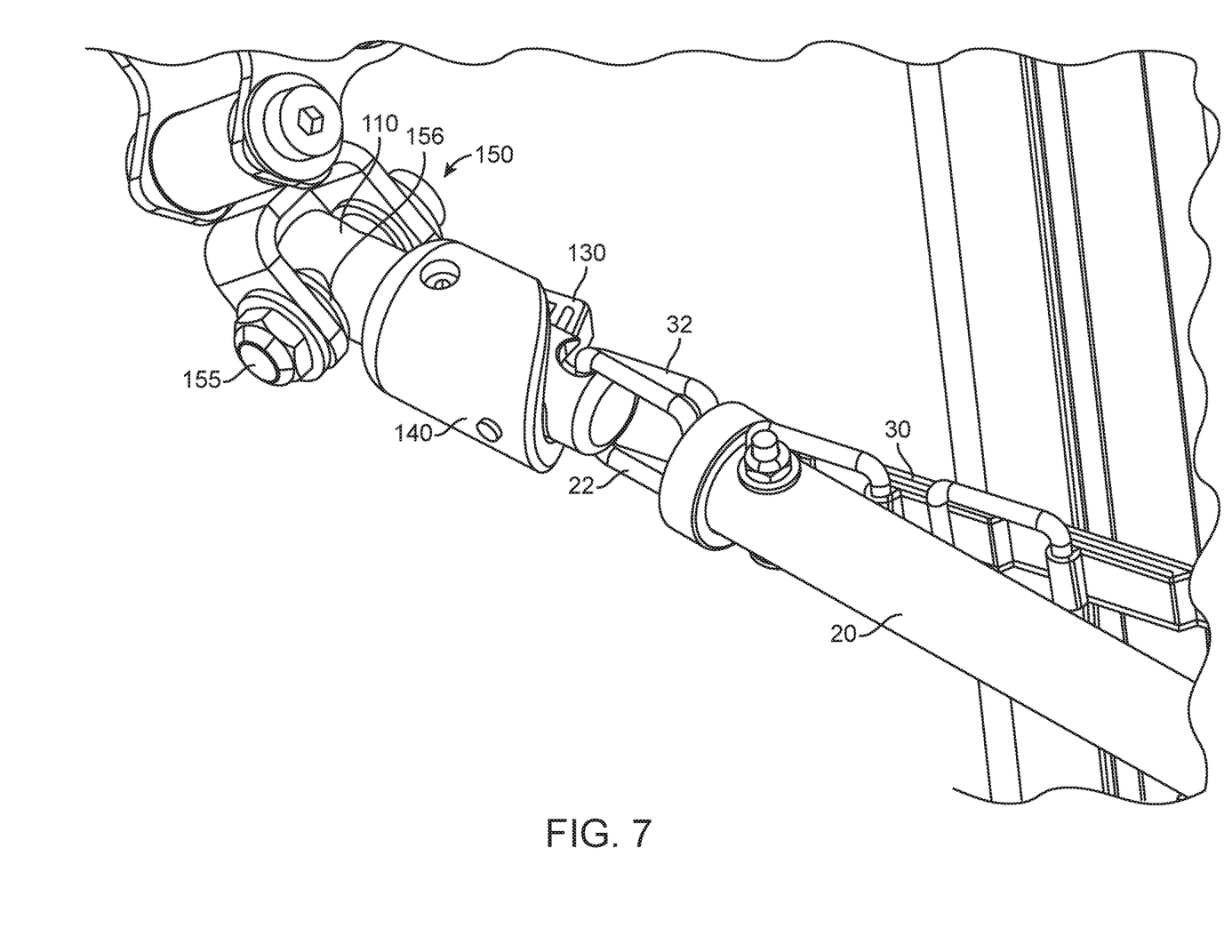
FIG. 7 corresponds to FIGS. 5 and 6, but viewed from a different angle.
Figure 8:
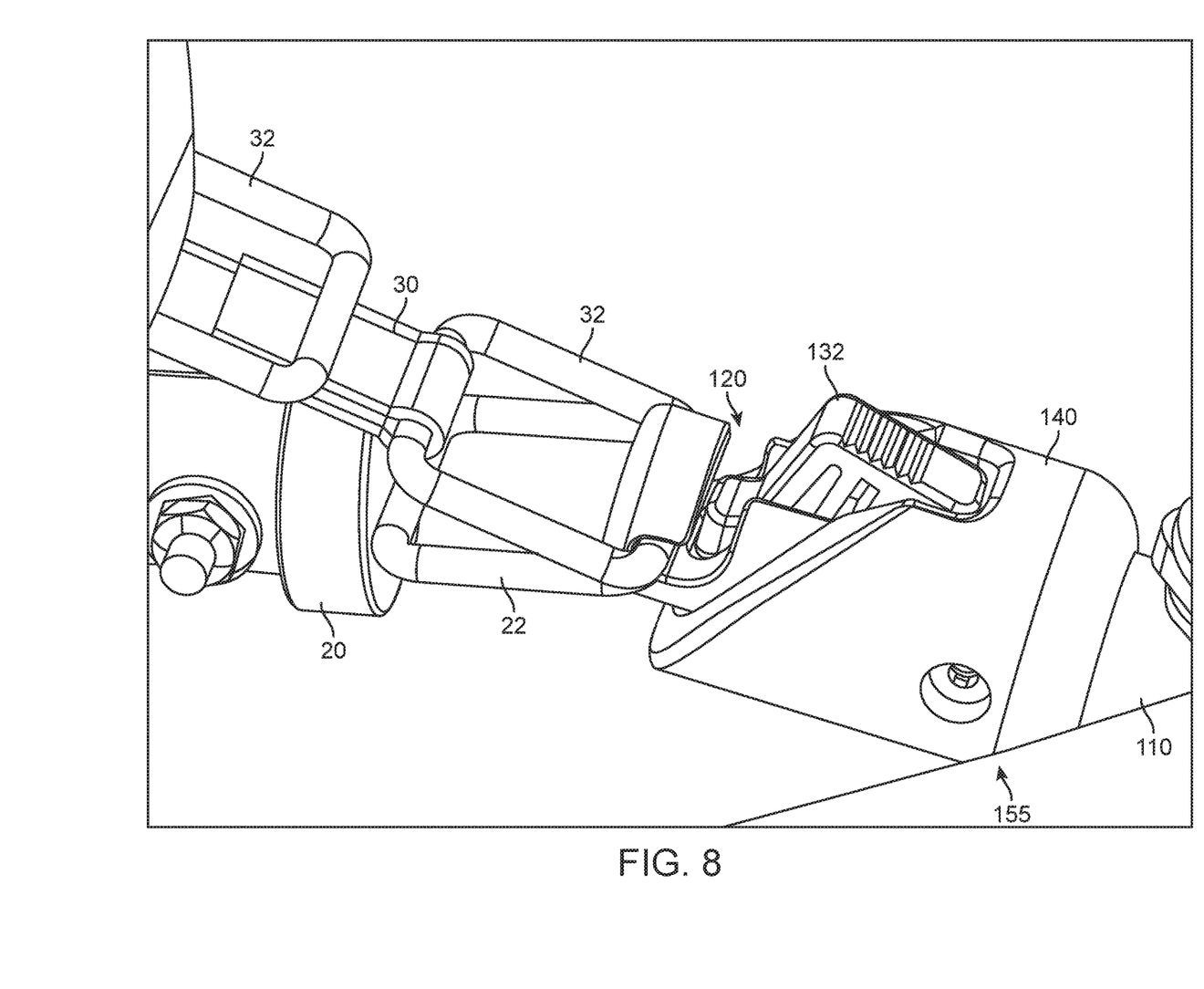
FIG. 8 is a further close-up view of the present quick release mechanism.
Figure 9:
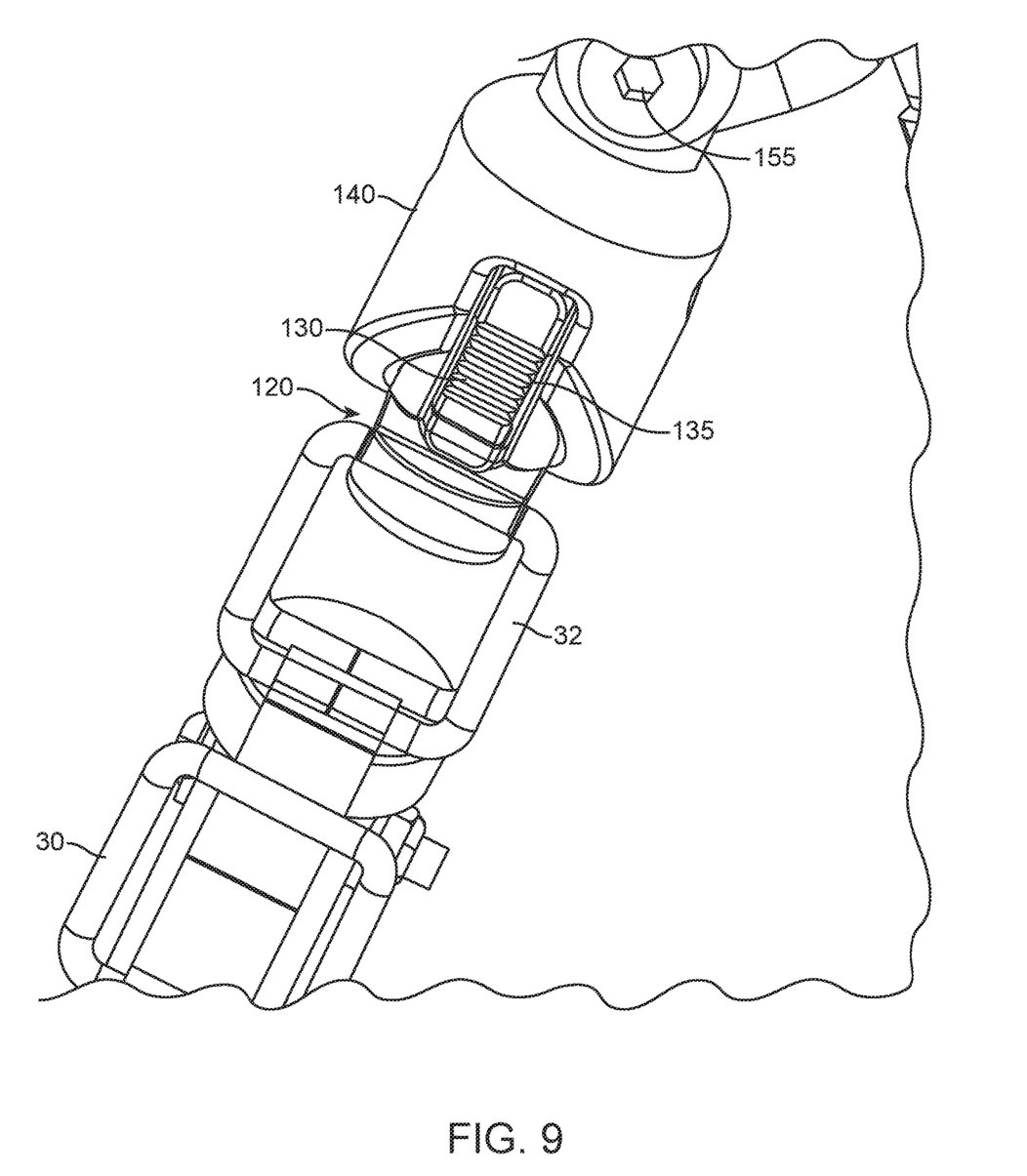
FIG. 9 is a top view of the present quick release mechanism.

As can also be seen in FIG. 5, ring 32 can optionally comprise a plurality of rings (32A, 32B, etc.) attached to flexible strap 30, with the rings 32 being distally spaced apart from one another. As such, a user can select which ring (32A or 32B) that they wish to connect to, and thereby adjust the effective length of exercise arm 30.

Figure 10:
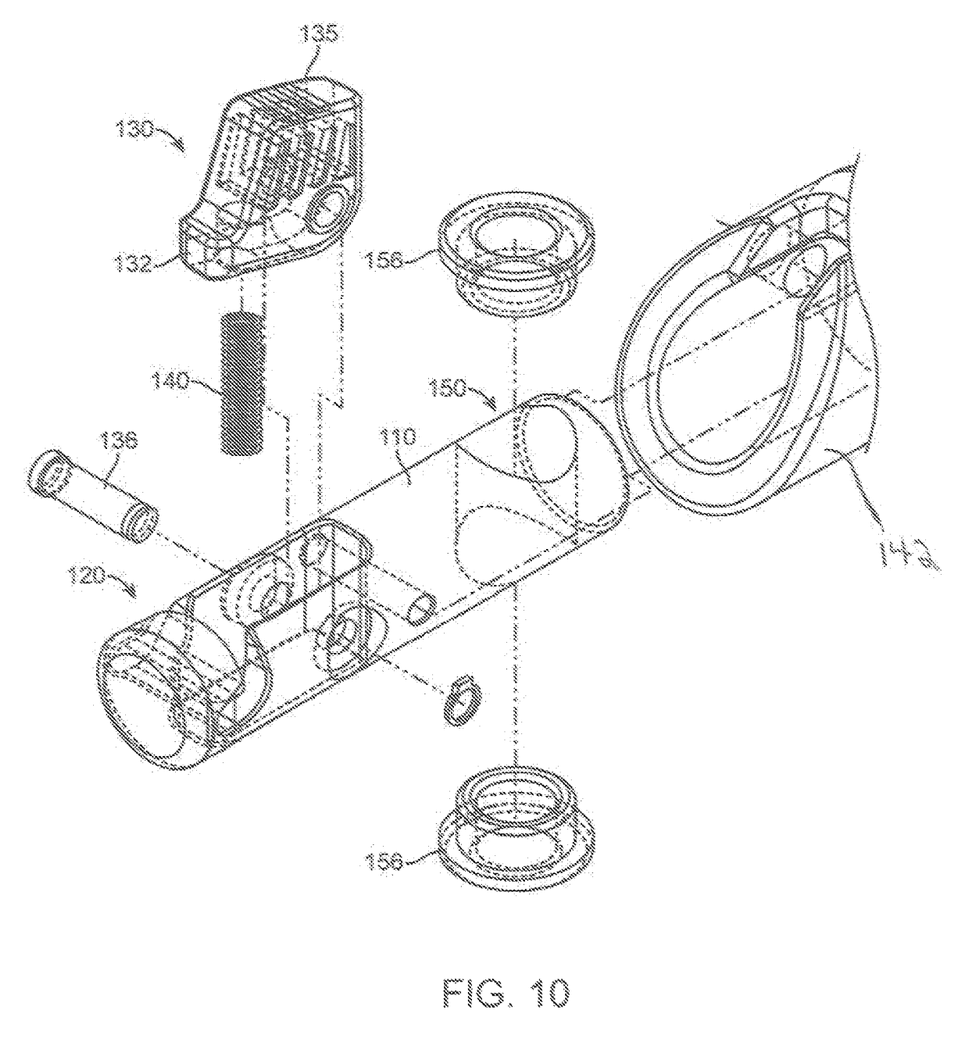
FIG. 10 is an exploded perspective view showing further details of the present quick release mechanism.

As best seen in FIG. 10, a forwardly extending portion 132 of button assembly 130 is moveable to: (i) project into aperture 120 when the button assembly is in its (upward and) locked position, or (ii) project away from aperture 120 when button assembly 130 is in its (pushed downward and unlocked position). A biasing member (spring 140) that urges the extending portion 132 of button assembly 130 into the upward and locked position.

As can be seen, elongated body 110 is preferably cylindrical in shape. As can also be seen (best in FIG. 10), the curved aperture 120 is dimensioned to receive a square-shaped or triangle-shaped ring passing therethrough. (See exemplary ring 22 or exemplary ring 32 in FIG. 5).

As best seen in FIG. 10, button assembly 130 is partially received within elongated body 110 and has a finger contact pad 135 projecting upwardly out of elongated body 100. Button assembly 130 is preferably held within elongated body 110 by a pin 136, and button assembly 130 pivots around pin 136 when finger contact pad 135 is pressed downwardly.

As can be seen, biasing member 140 is positioned under button assembly 130, thereby causing button assembly 130 to pivot around pin 136 such that the elongated portion 132 of button assembly projects into aperture 120. In operation, the user pushes down on button assembly 130 to move elongated portion 132 out of the way of aperture 120 such that the ring therein (22 or 32) can then be removed, and the exercise arm (20 or 30) removed or replaced with another exercise arm (30 or 20).

Optionally, a protective sleeve 142 can be provided with sleeve 142 passing around a portion of elongated body 110 (but not passing around the distal end of the elongated body, as shown). Optionally, a fastener hole 150 passes through a proximal end of elongated body 110 for receiving a connection bolt 155 and accompanying bushing 156 therethrough.

An advantage of the present system is its ease of operation. All the user has to do is to push down on button assembly 130, and the exercise arm (20 or 30) can quickly be removed/interchanged. When the user is not pushing down on button assembly 130, spring 140 will push button assembly 130 up into a locked position such that extending portion 132 will project into aperture 120, thereby locking ring (22 or 32) into position.

What is claimed is:

1. A quick release mechanism for an exercise arm assembly, comprising:
    an elongated body;
    a flexible exercise strap having a plurality of square or triangular-shaped rings disposed therealong;
    a curved aperture passing laterally across a distal end of the elongated body, the curved aperture cutting downwardly through the elongated body with a front end of the aperture being angled towards the distal end of the elongated body, wherein the curved aperture is shaped to be positioned against a first side of a straight portion of one of the plurality of square or triangular-shaped rings;
    a button assembly positioned near the distal end of the elongated body, the button assembly comprising a finger contact pad projecting outwardly from the elongated body and a forwardly extending portion disposed within the elongated body, wherein the forwardly extending portion of the button assembly is moveable to:
        project into the aperture to contact against a second side of the straight portion of the square or triangular-shaped ring, thereby locking the ring into position against the curved aperture when the button assembly is in a locked position, or
        project away from the aperture when the button assembly is in an unlocked positon; and
    a biasing member that urges the extending portion of the button assembly into the locked position.

2. The quick release mechanism of claim 1, wherein the elongated body is cylindrical.

3. The quick release mechanism of claim 1, wherein the extending portion of the button assembly is positioned at the distal end of the button assembly.

4. The quick release mechanism of claim 1, wherein the button assembly is held within the elongated body by a pin, and wherein the button assembly pivots around the pin when the finger contact pad is pressed downwardly.

5. The quick release mechanism of claim 4, wherein the biasing member is a spring positioned under the button assembly causing the button assembly to pivot around the pin such that the elongated portion of the button assembly projects into the aperture.

6. The quick release mechanism of claim 1, further comprising:
    a protective sleeve passing around a portion of the elongated body, but not passing around the distal end of the elongated body.

7. The quick release mechanism of claim 1, further comprising:
    a fastener hole passing through a proximal end of the elongated body for receiving a connection bolt therethrough.

* * * * *